May 14, 1957 C. H. FLANIGAN 2,791,876
DRIVE MEANS FOR MULTIPLE ROTATING DISC TYPE LAWN MOWER
Filed Aug. 10, 1953 2 Sheets-Sheet 1
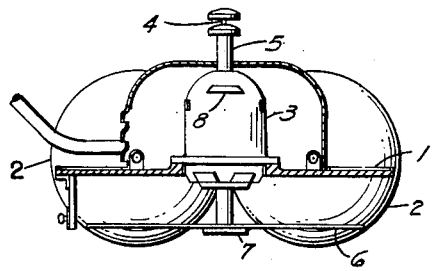
Fig.1
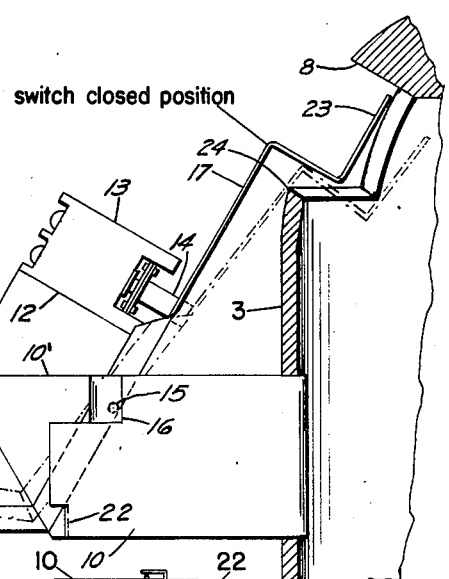
switch closed position
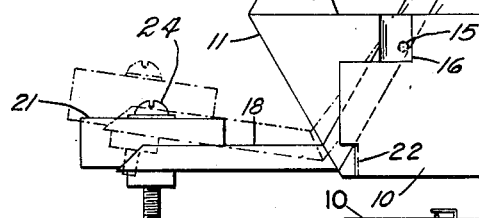
Fig.2
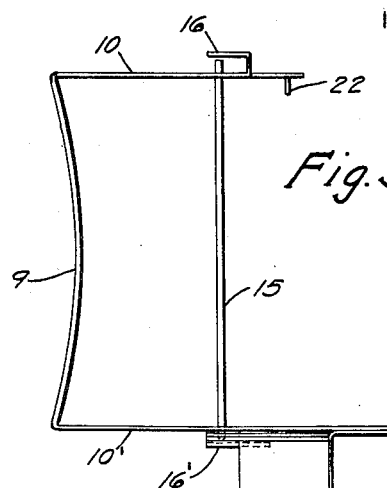
Fig.3
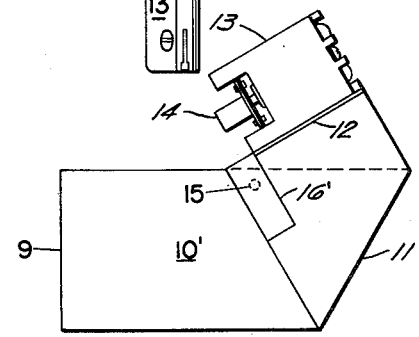
Fig.2a
Fig.4
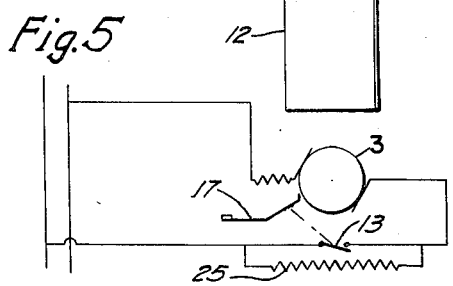
Fig.5
INVENTOR.
CLIFFORD H. FLANIGAN
BY Arthur H. Robert
ATTORNEY

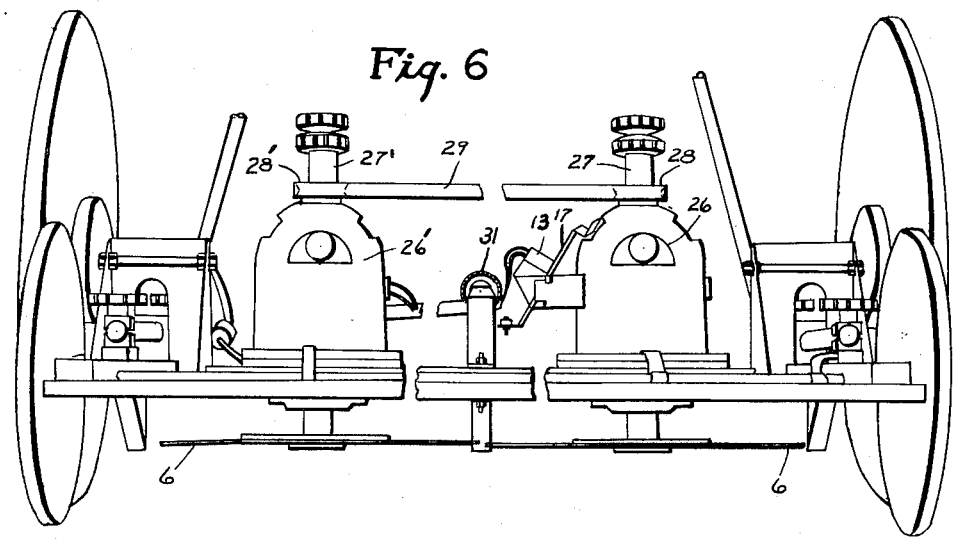
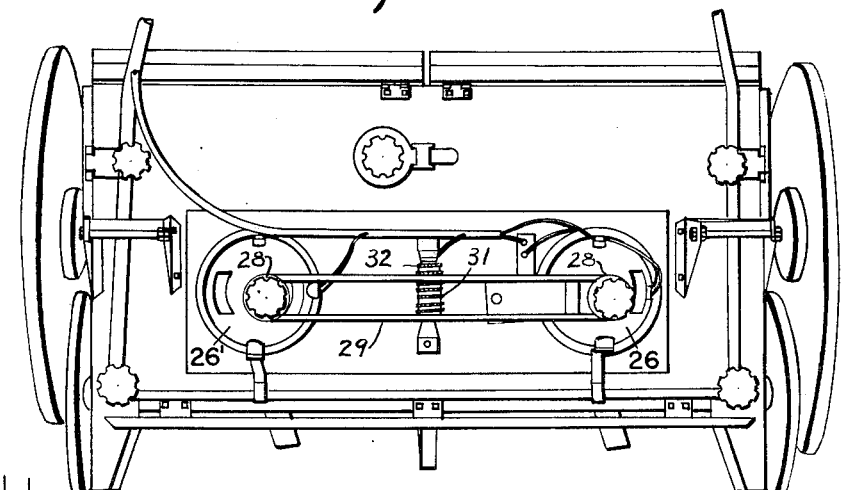
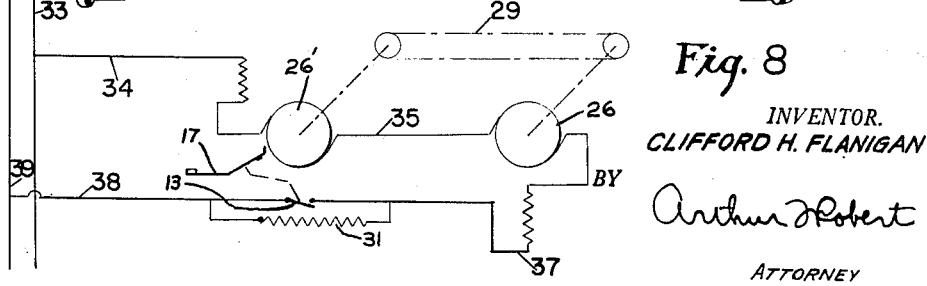

United States Patent Office 2,791,876
Patented May 14, 1957

2,791,876

DRIVE MEANS FOR MULTIPLE ROTATING DISC TYPE LAWN MOWER

Clifford H. Flanigan, New Albany, Ind.

Application August 10, 1953, Serial No. 373,093

4 Claims. (Cl. 56—25.4)

The present invention relates to electric mowers of the rotating blade type and has particular reference to a novel method of and apparatus for controlling the electric motor drive for the rotating blades. This invention is an improvement on the rotating blade type of electric mower described and claimed in my U. S. Patent 2,643,-502, granted June 30, 1953, which disclosure is here incorporated by reference.

The use of a series wound electric drive motor on this type of mower is desirable for various reasons. However if the blade structure rotates at a speed high enough to be effective under full load conditions, it will, under progressively lower load conditions, operate at progressively higher speeds and, in the upper portion of its speed range, usually produce an objectionable noise. For example, with a motor producing a blade speed of 5,000 R. P. M. at full load and 10,000 R. P. M. at no load, the blade noise will become increasingly objectionable at speeds ranging from 7,000 R. P. M. upwards.

One of the principal objects of this invention therefore is to provide a speed control arrangement which, under load conditions, ranging from full load to no load, limits the speed of the blade to an operating range extending from its normal speed at full load to a higher speed corresponding to its normal speed at a predetermined partial load, the partial load speed preferably being below the objectional noise range.

Another important object is to attain the principal object by means operating, in response to variations in the ventilating air flow of a fan cooled drive motor, to control or set the upper limit of the operating blade speed at a predetermined value.

In constructing a mower for cutting a swath of, say, double width, two blades rotating on separate axes are employed. To drive both blades from a single series wound motor, an expensive, specially constructed heavy duty 220-230 volt motor would be required for all practical purposes. On the other hand, two separate independently operated 110-115 volt series wound motors may be used and electrically connected either in series or in parallel. None of these arrangements is wholly satisfactory for various reasons.

Another principal object of this invention is to provide a wholly satisfactory drive arrangement utilizing separate series wound motors for each rotating blade and mechanically interconnecting these motors so that they share the load more or less equally under all conditions of operation ranging from a full load on both blades and motors to no load on both and including a partial or full load on one blade with a lower load on the other blade ranging downwardly to no load.

Another important object is to provide a multiple electric motor load-sharing drive arrangement with means operating, in response to the ventilating air flow variations of at least one motor, to limit the highest operating speeds of both blades to a value which is relatively unobjectionable from a noise producing standpoint.

Embodiments of the invention are illustrated in the accompanying drawing wherein:

Figure 1 is a central sectional view of one embodiment taken on a longitudinal plane passing vertically through the electric drive motor and blade structure but showing both of these parts in elevation;

Figure 2 is a side elevational view on an enlarged scale of a speed controller applied to a drive motor, such as is shown in Figure 1, the motor housing being fragmentarily shown in section;

Figure 2a is a top plan view on a reduced scale of the speed controller as it appears in Figure 2, this view showing the bracket rotated a half turn from its Figure 2 position and omitting the motor housing;

Figure 3 is a top plan view of the bracket which forms a part of the speed controller shown in Figures 2 and 2a and which supports that controller on the motor;

Figure 4 is an end elevational view of the bracket shown in Figure 3, looking at the lower end of that bracket as it appears in Figure 3 but adding to it a control switch;

Figure 5 is a schematic diagram illustrating the operating principle of the speed controller;

Figure 6 is a front elevational view of another embodiment showing an electric mower embodying the load-sharing feature of my invention as well as the speed control feature;

Figure 7 is a top plan view of the embodiment shown in Figure 6; and

Figure 8 is a schematic diagram of the mower of Figure 6, this figure illustrating the speed control and load-sharing features.

The electric mower shown in Figure 1 is constructed substantially as described in my U. S. Patent No. 2,643,-502, granted June 30, 1953. This mower comprises a base plate or chassis 1 supported on wheels 2 and carrying a hollow shaft series wound motor 3 with a rod 4 extending through the hollow shaft 5 of the motor and carrying the cutting blade 6 driven by the motor through a friction clutch connection 7. The motor housing has one or more openings 8 through which air is drawn for cooling the motor, the air being discharged at the bottom of the motor through suitable openings.

The speed controller shown in Figures 2–5 includes a bracket 9 mounted on the motor housing adjacent one of the openings 8. This bracket preferably is constructed from a sheet metal strip bent into U-shape to provide a bight, which is also designated 9, and a pair of arms 10, 10'. One arm 10' is doubled back at 11 on a biased line disposed at about 45° and then bent outwardly or laterally to provide a shelf 12 on which is mounted a microswitch 13 of the snap type.

This type of switch has operating arm 14 which is resiliently or yieldably urged outwardly from the switch toward the switch-open position. When the arm 14 is moved a slight distance one way or another, it causes the switch elements (not shown) to snap to an open position or closed position depending upon the direction of arm movement. I have found that a microswitch of this type will operate indefinitely, as a resistance short circuiting switch, under normal current loads of 6 to 12 emperes without burning the switch points. This switch is mounted on shelf 12 with its operating arm 14 extending transversely parallel to the body of the switch and projecting therefrom transversely across the adjacent edge of arm 10' of bracket 9 with its projecting end terminating in an inwardly bent tip, also designated 14. The tip is inwardly bent at right angles more or less to extend toward or into the space between bracket arms 10 and 10'.

The bracket arms cooperate to carry an axle 15 which is retained against removal, from its position on the bracket, by bending bracket-arm tips 16 and 16' to extend over the ends of the axle 15. A rocker arm 17 made of a strip of sheet metal is positioned with its mid-portion arranged to extend transversely across the space between bracket arms 10 and 10'. This rocker arm 17 has reinforcing flanges 18 at its sides. The axle 15 extends through flanges 18 and thus mounts the rocker arm 17 for pivotal movement relatively to bracket 9.

The lower end 19 of the rocker arm is bent relatively to its mid portion and arranged to carry a counterweight 21 which yieldably urges the lower end of the rocker arm pivotally downward into engagement with a stop 22 on bracket arm 10. The upper end of the rocker arm 17 is bent toward the motor housing to provide an offset vane 23 and to place it in a position where it is subject to and influenced by the ventilating air that enters the motor housing through opening 8. The tip 14 of the switch arm bears on the rocker arm 17 above the axle 15. The counterweight 21 is sufficient to hold the rocker arm yieldably against stop 22 or in the solid line position shown in Figure 2 during the lower speed and lower air flow ranges of operation of the motor 3. When the rocker arm 17 is in this heavy load or low-speed and low-air flow position, it holds the switch arm 14 in the switch-closed position wherein switch 13 short-circuits a resistance 25 in series with the motor 3.

As the load falls, the speed and air flow rises, the latter ultimately reaching a point where it moves the rocker arm 17 the switch-open dotted line position shown in Figure 2. This cuts the resistance 25 into the circuit and thus reduces the voltage across the motor. With the voltage reduced, its speed is reduced. If the load progressively falls off to no-load, the speed will progressively increase but, as is well known, the no-load speed may be readily held below the objectionable noise range by using a resistance of appropriate value.

In operation, I assume: that a series wound 110–115 volt motor, operating between 5,000 and 10,000–12,000 R. P. M. under full-load and no-load conditions respectively, is employed; that the noise of the cutting blade begins to be objectionable at speeds ranging from 7,000 R. P. M. upwardly; and that the rocker arm 17 is counterweighted so that it will operate in the neighborhood of 5,500 to 5,800 R. P. M. Under full load conditions, the counterweight will hold the switch in the closed position. When the load decreases enough to allow the speed to rise to 5,800 R. P. M., the air flow will have become sufficient to move the rocker arm inwardly, in relation to the motor housing, to the extent required to allow the switch arm to move to the switch open position. This will reduce the speed to a value, say approximating 5,500, and, at the same time, reduce the current flow from, say, 10 amperes to 6 amperes. But this reduction in speed and current will not necessarily cause the switch to reclose without a further reduction in speed.

If the load continues to fall off, the speed will continue to increase but the increase is less substantial now, with the resistance in the circuit, than it would be with the resistance short circuited. With a proper resistance in the circuit, the no load speed will be less than 7,000 R. P. M. The setting of the speed controller may be varied but, under most conditions of operation, it is preferably set to operate in the 75–85% load range. In other words, it should operate at a speed substantially below that at which the noise becomes objectionable and substantially above the full load operating speed.

Under certain conditions of operation, where higher blade speeds are desired, as is the case in pulverizing leaves or in cutting heavy strands of thick grass, the setting may be varied to a higher value either by using a smaller weight 21 or by adjusting or shifting the weight to reduce its distance from the fulcrum shaft 15. To this latter end, the weight platform 19 of rocker arm 17 has a slot 28 to receive the screw 24 mounting the weight 21 on the rocker arm.

In the embodiment shown in Figs. 6 to 8, the frame of the mower supports two motors 26, 26' which may be 110–115 volt motors substantially like motor 3. Each of these motors carries a cutter blade 6 mounted on the motor shafts 27 and 27' as before. One of these motors, say motor 26, preferably is equipped with the above-described speed controller. The motor shafts 27 and 27' carry V pulleys 28, 28' respectively and a V belt 29 extends around the pulleys. This arrangement compels the motors to operate at the same speed and to share the load. A resistor 31 is mounted on a ceramic insulator 32 on the chassis.

A 220–230 volt circuit for operating the motors, is shown in Figure 8. It places the motors 26' and 26 and the speed controller all in series. Accordingly current flows from power line 33, lead line 34, motor 26', connecting line 35, motor 26, line 37, the speed controller, and line 38 to power line 39. With this arrangement, both motors will share the load more or less equally at all times.

Where both cutting blades are operating under the same load conditions, each motor will drive its own blade more or less independently of the other. However, where one blade operates under a lower load condition than the other blade, the motor of the lightly loaded blade will tend to increase its speed. In doing this, it simply tends to drive the belt 29, connecting it to the other motor, at a higher rate of speed and, as a result, takes some of the load from the heavily loaded motor, the ultimate division of the load being substantially equal. Where the speed of both motors tends to rise above the predetermined value at which rocker arm 17 operates, that arm will operate to throw the resistor 31 in series with both motors and thus limit the upper speed range as before.

The advantage of the speed control arrangement resides in the fact that it can operate under all load conditions without producing an objectionable noise. In this connection, it will be appreciated that the capacity or power of the drive motor is reduced by the speed controller only in the lighter load ranges where a reduction in work capacity can be afforded. The advantage of the load-sharing arrangement is that it compels both motors to share the load and operate at equal speeds and it thus prevents one motor from racing while the other is operating at full load. In this connection, it may be noted that two or more motors may be connected to share the load. While such motors may be electrically connected in parallel, a series arrangement is preferred because it minimizes the load in terms of amperes and thus permits the use of a lighter electric cable than would otherwise be the case. Furthermore, if one blade is operating under light load conditions, the other blade may be operating under over load conditions without necessarily imposing an over-load on the motor. This condition is true so long as the total load does not exceed the full load of both motors.

I claim as my invention:

1. A lawn mower comprising: a mobile lawn mower frame; a plurality of electric motors mounted on said frame and electrically connected in series with each other, said motors being of the type which progressively change speed in one direction as the load progressively changes in one direction over a given range; a plurality of horizontally spaced rotary cutter blades, one for each motor, each driven by its motor shaft; and power transmitting means mechanically interconnecting said motor shafts to compel each of said motors to share the total load.

2. The mower of claim 1 wherein: said power transmitting means includes a belt which extends from one shaft to another and is connected to both.

3. The mower of claim 1 wherein: the shafts of the motors project upwardly; and said power transmitting means interconnects the upwardly projecting portions of said shafts.

4. The mower of claim 3 wherein: said power transmitting means includes a belt which extends between the upwardly projecting portions of said shafts and is connected to said shafts.

References Cited in the file of this patent

UNITED STATES PATENTS

| | | |
|---|---|---|
| 2,144,734 | Jepson | Jan. 24, 1939 |
| 2,193,712 | Campbell | Mar. 12, 1940 |
| 2,245,821 | Poynter | June 17, 1941 |
| 2,425,178 | Ellerbeck | Aug. 5, 1947 |
| 2,643,502 | Flanigan | June 30, 1953 |